A. EDWARDS.
Lumber Driers.
No. 134,529.             Patented Jan. 7, 1873.
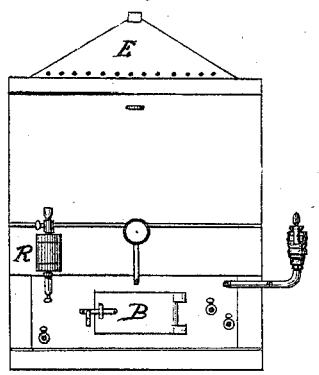
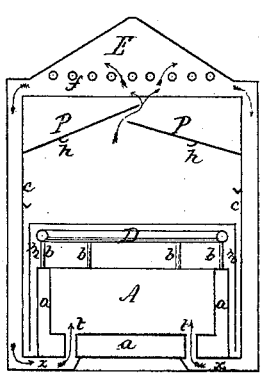
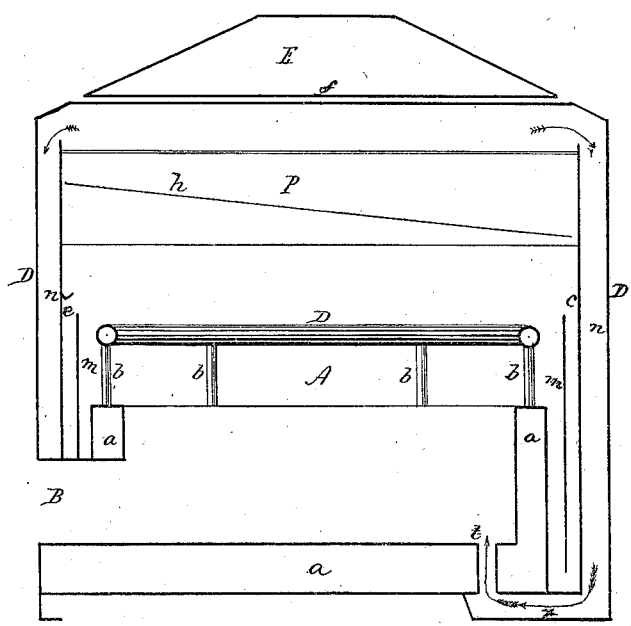
Witnesses                            Alfred Edwards
                                                      Inventor
                                                      By Atty.

UNITED STATES PATENT OFFICE.

ALFRED EDWARDS, OF NEW HAVEN, CONNECTICUT, ASSIGNOR TO ALFRED R. EDWARDS, OF CHICAGO, ILLINOIS.

IMPROVEMENT IN LUMBER-DRIERS.

Specification forming part of Letters Patent No. 134,529, dated January 7, 1873.

*To all whom it may concern:*

Be it known that I, ALFRED EDWARDS, of New Haven, in the county of New Haven and State of Connecticut, have invented a new Improvement in Apparatus for Drying Lumber; and I do hereby declare the following, when taken in connection with the accompanying drawing and the letters of reference marked thereon, to be a full, clear, and exact description of the same, and which said drawing constitutes part of this specification, and represents, in—

Figure 1, a front view; Fig. 2, a transverse central section; and in Fig. 3, a longitudinal central section.

This invention relates to an improvement in apparatus for drying lumber; the object being to thoroughly season the lumber by heat, generating steam from the moisture in the lumber until all the moisture is expelled, the heat being produced from steam-chambers and without direct contact with the fire surface.

A is the drying-chamber, which is inclosed by hollow walls and bottom *a*. The space in these hollow walls may be filled with water and heated by a fire beneath, or steam from any boiler may be admitted to the hollow walls to keep a constant supply of steam. Around the upper part of the chamber A I extend a tube, D, which communicates by vertical tubes *b* with the space between the hollow walls, in order to form a large amount of radiating surface. Around the said chamber I arrange a partition, *c*, a short distance from the said hollow walls, and so as to leave a space between the said partition and hollow walls, this space being divided by another partition, *m*, to prevent the communicating of heat to the partition *c* from the walls *a*. Outside the whole an outer wall, D, is arranged as an inclosure, and so as to form a space been the partition *c* and the outer walls. This last-named space at the bottom turns beneath the steam-chamber, forming a flue, *x*, which opens through suitable orifices *t*, more or less in number, into the drying-chamber. A door, B, opens directly into the drying-chamber, as seen in Fig. 3, and the whole is covered by a roof-like structure, E. Through the roof E I arrange tubes *f*, more or less in number, opening at both ends (as seen in Fig. 3) to the atmosphere, which will keep these tubes constantly cool. Therefore, suppose the chamber A to be filled with lumber to be seasoned and hot steam allowed to fill the space in the hollow walls and tubes, or water heated therein, heat will be generated therefrom in the said chamber, and will pass up through the lumber to the top, and, cooling by means of the tubes *f* and the thin roof, will return through the space or flue *n x* again into the chamber, as denoted by the arrows, to be again heated within the chamber, rising and returning as before. The heat which thus passes through the hot lumber will generate steam from the moisture therein, and this, moving in the same direction as the heated air, will finally reach the upper portion and be brought into contact with the air-tubes *f*, the steam being condensed while the air returns and circulates as before. This condensation will drop upon the inclined plates P, and there be led out through any suitable conductors to drain off. As there will be some condensation of steam upon the plates P I construct them with ledges *h*, which will receive and conduct away the condensation. The steam-space or hollow walls *a* are provided with requisite gages, safety-valves, &c., as denoted in Fig. 1.

If steam directly from another boiler is employed to fill the hollow walls the arrangement should, for the sake of economy, be constructed so that the condensation which occurs within the walls will return to the boiler; but where heat is applied directly to the walls a reservoir, R, is applied, as denoted in Fig. 1, to replenish the water which may waste away, though it is not designed that any steam should escape from this space, steam being generated only sufficiently rapid to keep the whole chamber heated and supply the natural condensation within the space. The air within the chamber A being heated over and over, nothing escapes therefrom but the condensation arising from the steam generated from the moisture of the lumber.

While I believe the means which I have shown to be the best for taking away the condensation from the chamber, other means may be devised, it only being essential that the hollow walls, partition, and chamber, and the space between the partition and walls, should exist in order to accomplish the circulation of air within the chamber, as described.

I claim as my invention—

1. The heating-chamber, formed by the hollow walls and bottom $a$, combined with the partition $c$ around the said chamber so as to form a flue, $n$, to reconduct the air beneath the said chamber and return it through the said chamber, substantially as described.

2. In combination with the subject-matter of the first clause of claim, the condensing-tubes $f$ arranged above the chamber, substantially as described.

3. In combination with the subject-matter of the first clause of claim, the inclined drip-plates P, more or less in number, and with or without the ledges $h$, substantially as specified.

ALFRED EDWARDS.

Witnesses:
A. J. TIBBITS,
J. H. SHUMWAY.